Sept. 8, 1931.  W. WERNER  1,821,952
THREADLESS PIPE COUPLING
Filed July 5, 1927  2 Sheets-Sheet 1
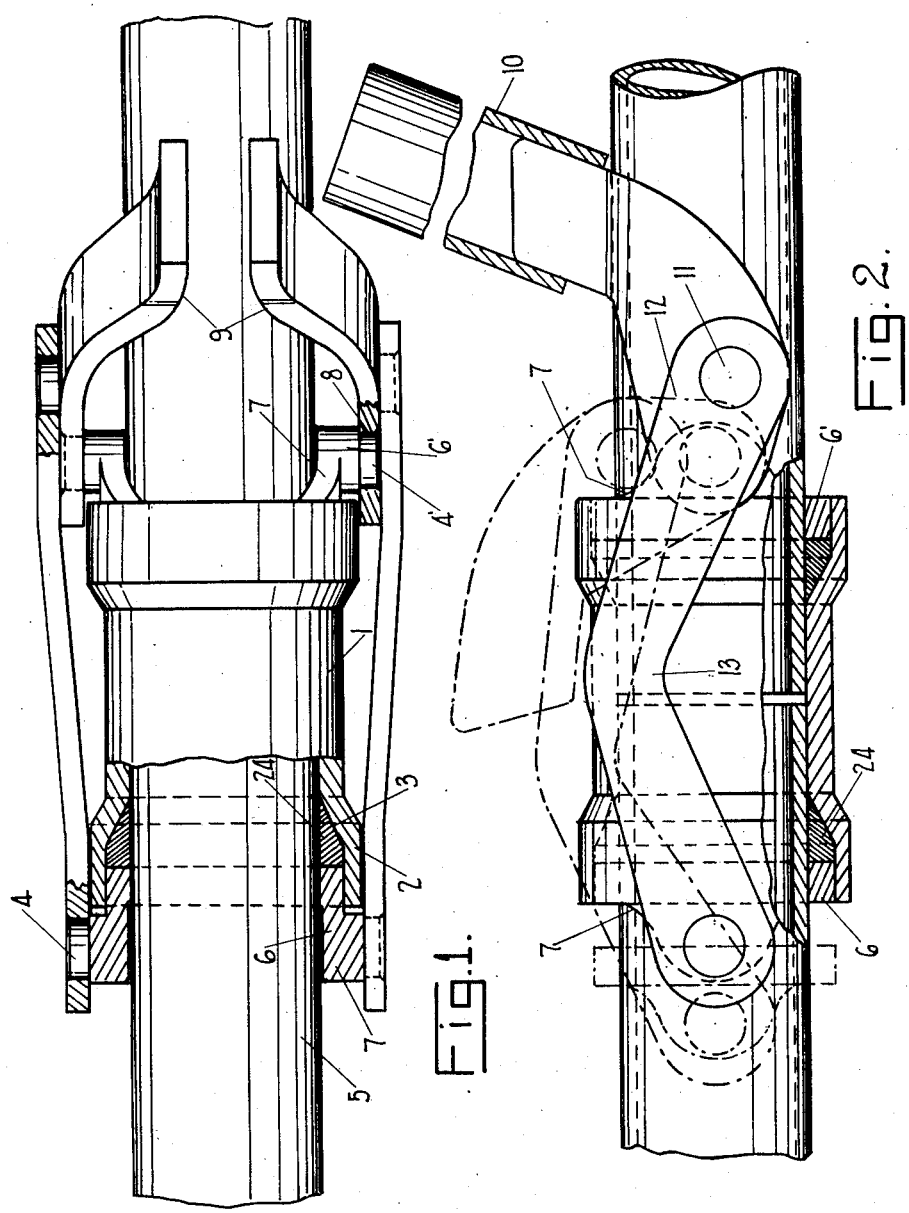
William Werner INVENTOR.
BY Jesse R. Stone
ATTORNEYS.

Sept. 8, 1931.  W. WERNER  1,821,952
THREADLESS PIPE COUPLING
Filed July 5, 1927  2 Sheets-Sheet 2
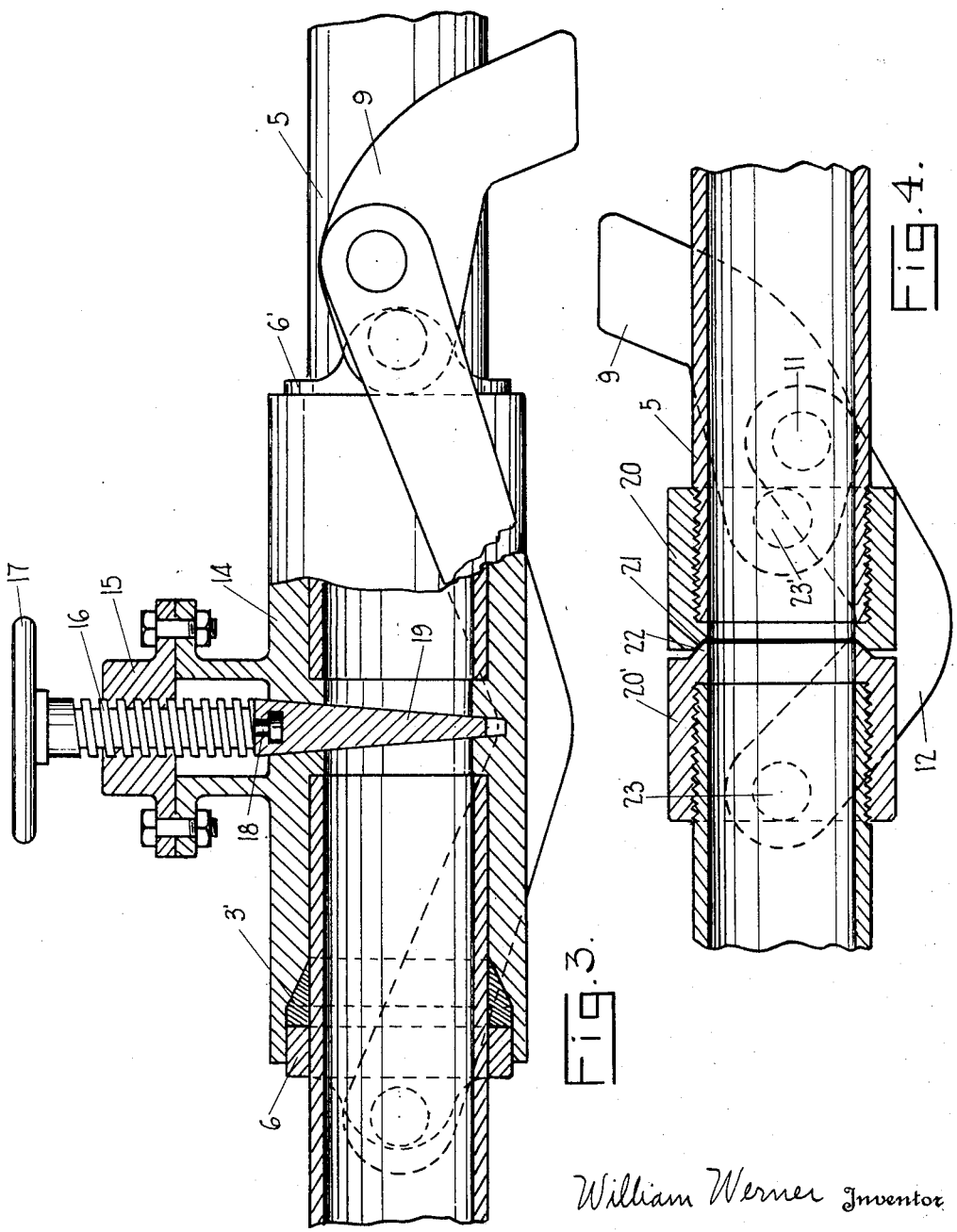

Patented Sept. 8, 1931

1,821,952

UNITED STATES PATENT OFFICE

WILLIAM WERNER, OF MEXIA, TEXAS, ASSIGNOR OF ONE-HALF TO W. B. SMITH, OF MEXIA, TEXAS

THREADLESS PIPE COUPLING

Application filed July 5, 1927. Serial No. 203,444.

My invention relates to couplings for pipe and, although of general application, is particularly adapted for use in pipe lines about oil field equipment.

It is an object of the invention to provide a coupling which is easily and quickly applied to or removed from the ends of the pipe and which will make a tight closure between the ends of the pipe sections.

It is desired that the coupling be capable of rapid connection where it becomes desirable to make and break the joint frequently.

It is also desired to provide a coupling without threads, thus avoiding frequent rethreading of the coupling. It is a further object to provide a coupling which can be connected in close quarters where the screwing up or unscrewing of an old type coupling would be inconvenient or impossible.

Referring to the drawings wherein the invention is shown; Fig. 1 is a top plan view of a coupling employing my invention, some parts being broken away. Fig. 2 is a side view partly in elevation and partly in section of the coupling. Fig. 3 shows the coupling as applied to a valve body, and Fig. 4 is a central vertical section showing a different embodiment of the invention as applied to a union.

Like numerals of reference are employed to designate like parts in all the views.

The coupling member of my joint may be a cylindrical collar 1, the ends of which are swedged outwardly at 2 to a larger diameter, thus forming an inner seat or stuffing box 3 about the pipe 5 which fits the interior diameter of the collar.

The seat 3 is tapered and receives a packing member 4 of compressible composition which may be forced into close and fluid tight contact with the pipe and box by a gland 6.

There are glands 6 and 6', one at each end of the sleeve, each gland having opposite trunnions 4 mounted upon longitudinally extending ears 7 on said glands. The trunnions upon the gland 6' are connected within openings 8 in the inner ends of separate lever arms 9 which are curved outwardly and upwardly and are brought close enough together at their outer ends 9' to receive therebetween a pipe section 10, which may act as a lever arm extension, whereby both arms 9 may be simultaneously operated.

Spaced outwardly from the trunnions 4, the lever arms are connected by pins 11 to links 12. Said links connect the pins 11 and the trunnions 4 and to provide a slight resiliency said links are bowed upwardly between their ends at 13.

The links and the lever arms form a clamping means to force the glands 6 and 6' tightly into their seats. When the arms are thrown inwardly over the collar, as shown in dotted lines in Fig. 2, the glands will be released and access may be had to the packing, or the joint may be uncoupled. When the lever arms are thrown outwardly into the full line position the trunnions 4' will form a fulcrum for the lever and the links will be drawn tightly to force the glands 6 and 6' into their seats. When the pins 11 have moved downwardly past center of the trunnions 4' the joint will hold tightly and the lever extension 10 may be removed.

In the use of this type of coupling upon a gate valve the valve housing 14 has its ends of the proper size to fit the ends of the pipe 5, which it connects. Said valve housing may have a bonnet 15 of any desired type through which a threaded valve stem 16 may operate. Said stem has a handle 17 thereon for rotation of said stem, and its lower end is rotatably connected at 18 with a wedged shaped valve 19. The construction of the valve itself is immaterial, as it is to be understood that the invention may be applied to any preferred type of valve, either of the rising stem type or the type in which the stem is not adapted to move vertically.

The ends of the housing 14 above the ends of the pipe sections are recessed at 3' to receive a gland 6, or 6', as in the previous modification. The construction of the mechanism by means of which the glands are forced inwardly against the packing to compress it is the same as in the previous embodiment. It is in fact the same invention.

In Fig. 4 I have shown the invention as applied to a union between the meeting ends of a pipe. In this embodiment the ends of the pipe sections 5 are threaded for engagement with the coupling members 20 and 20'. The meeting ends of the two couplings 20 and 20' are formed to interfit, there being an inwardly beveled seat 21 upon the section 20, and a forwardly beveled pin member 22 on the coupling 21'.

These two parts of the coupling member forming the union are forced together into tight contact with each other by an arrangement similar to that shown in the first embodiment. There are lateral trunnions 23 toward the outer ends of each of the coupling sections and the links 12 are connected to the trunnions 23 on one of the sections, and the forward end of the lever arms 9 are connected to the trunnions 23' upon the other coupling section. The links 12 are connected at 11 to the lever arms 9 and serve the same purpose as previously set out, of drawing the ends of the couplings together when the lever arms are moved into the closed position shown in Fig. 4. The joint may be uncoupled by moving upwardly on the lever arms 9 from the position shown in Fig. 4, and the mechanism provides a means of quick release, or a similar rapid connection between the parts by the operation of the lever arms 9.

The advantages of my construction lie in the fact that the joints may be coupled together quickly and without any mutilation of the pipe. There are no threads at the joint which have to be unscrewed when the joint is disconnected, or to be screwed up when the joint is made. The coupling is therefore adapted for use where the connection or disconnection between the members of the joint must be made at fairly frequent intervals. It will be obvious that the links which connect the different parts of the joint will be resilient so as to exert a material amount of tension which will adapt the joint for wear or compression of the packing. The further advantages of the construction will be apparent to those skilled in the art.

What I claim as new and desire to protect by Letters Patent is:

A device for coupling pipe comprising in combination a sleeve, a packing seat in each end thereof, a pair of oppositely disposed slidable ring glands adapted to enter said sleeve and engage said packing, a pair of ears on each gland, links pivoted to one of said pairs of ears, levers pivoted to the other said pair of ears, and pivots carried by said levers to attach said links together.

In testimony whereof I hereunto affix my signature this 29th day of June A. D. 1927.

WILLIAM WERNER.